(12) United States Patent
Kitamura et al.

(10) Patent No.: US 11,796,402 B2
(45) Date of Patent: Oct. 24, 2023

(54) TACTILE SENSOR

(71) Applicant: MINEBEA MITSUMI Inc., Nagano (JP)

(72) Inventors: Atsushi Kitamura, Shizuoka (JP); Shigeyuki Adachi, Shizuoka (JP); Toshiaki Asakawa, Shizuoka (JP); Satoshi Suzuki, Tokyo (JP); Shinya Yamaguchi, Tokyo (JP); Hirotsugu Iijima, Tokyo (JP)

(73) Assignee: MINEBEA MITSUMI Inc., Nagano (JP)

( * ) Notice: Subject to any disclaimer, the term of this patent is extended or adjusted under 35 U.S.C. 154(b) by 397 days.

(21) Appl. No.: 17/260,727

(22) PCT Filed: Jul. 3, 2019

(86) PCT No.: PCT/JP2019/026471
§ 371 (c)(1),
(2) Date: Jan. 15, 2021

(87) PCT Pub. No.: WO2020/022011
PCT Pub. Date: Jan. 30, 2020

(65) Prior Publication Data
US 2021/0270683 A1   Sep. 2, 2021

(30) Foreign Application Priority Data

Jul. 23, 2018  (JP) .................................. 2018-137451

(51) Int. Cl.
*G01L 1/20*    (2006.01)
*B25J 13/08*   (2006.01)
(Continued)

(52) U.S. Cl.
CPC ............. *G01L 1/205* (2013.01); *B25J 13/084* (2013.01); *G01L 1/2287* (2013.01); *G01L 5/0028* (2013.01)

(58) Field of Classification Search
CPC ..... G01L 1/205; G01L 1/2287; G01L 5/0028; B25J 13/084
(Continued)

(56) References Cited

U.S. PATENT DOCUMENTS

| 4,550,310 A | * | 10/1985 | Yamaguchi | ........ H03K 17/9622 |
| | | | | 307/116 |
| 4,709,342 A | * | 11/1987 | Hosoda | ................... G01L 5/228 |
| | | | | 901/33 |

(Continued)

FOREIGN PATENT DOCUMENTS

| JP | S63-266328 | 11/1988 |
| JP | H06-300649 | 10/1994 |

(Continued)

OTHER PUBLICATIONS

International Search Report for PCT/JP2019/026471 dated Aug. 6, 2019.
(Continued)

*Primary Examiner* — Max H Noori
(74) *Attorney, Agent, or Firm* — IPUSA, PLLC (57) ABSTRACT

A tactile sensor includes a support member with a curved surface, a sensor body disposed on the support member, and a buffer member with which the sensor body is coated, the buffer member being configured to, in response to contacting an object, transfer a force applied from the object to the sensor body. The sensor body includes an insulating layer, multiple first resistive portions of which a longitudinal direction is directed to a first direction of each and that are juxtaposed on one side of the insulating layer, multiple (Continued)

second resistive portions of which a longitudinal direction of each is directed to a second direction intersecting with the first direction and that are juxtaposed on another side of the insulating layer, and a pair of electrodes provided at both end portions of each of the first resistive portions and the second resistive portions. The press force applied from the object is transferred to the sensor body, and at least one given resistive portion among the first resistive portions and the second resistive portions is pressed, so that a resistance value between a given pair of electrodes associated with the pressed at least one given resistive portion among the first resistive portions and the second resistive portions constantly varies in accordance with a magnitude of the press force.

18 Claims, 7 Drawing Sheets

(51) Int. Cl.
*G01L 1/22* (2006.01)
*G01L 5/00* (2006.01)

(58) Field of Classification Search
USPC ..................................... 73/862.632, 862.042
See application file for complete search history.

(56) References Cited

U.S. PATENT DOCUMENTS

| | | | |
|---|---|---|---|
| 8,069,735 B1 * | 12/2011 | Egorov | G01L 1/146 |
| | | | 73/862.041 |
| 2011/0226069 A1 | 9/2011 | Kim et al. | |
| 2012/0017702 A1 * | 1/2012 | Kawabe | G06F 3/0414 |
| | | | 73/862.381 |
| 2014/0035603 A1 | 2/2014 | Ray | |
| 2015/0250420 A1 * | 9/2015 | Longinotti-Buitoni | ..................... |
| | | | A61B 5/1135 |
| | | | 600/534 |
| 2018/0172527 A1 | 6/2018 | Kim et al. | |
| 2019/0046051 A1 * | 2/2019 | Kato | A61B 5/02 |
| 2022/0000392 A1 * | 1/2022 | Werner | A61B 5/746 |

FOREIGN PATENT DOCUMENTS

| | | |
|---|---|---|
| JP | H09-014989 | 1/1997 |
| JP | 2004-333273 | 11/2004 |
| JP | 2008-116319 | 5/2008 |
| JP | 2011-197001 | 10/2011 |
| JP | 2014-035239 | 2/2014 |

OTHER PUBLICATIONS

Office Action dated Apr. 5, 2022 with respect to the corresponding Japanese patent application No. 2018-137451.
Office Action dated Jun. 21, 2022 with respect to the corresponding Japanese patent application No. 2018-137451.

* cited by examiner

TACTILE SENSOR

TECHNICAL FIELD

The present invention relates to a tactile sensor.

BACKGROUND

Research and development for a tactile sensor used for a robot hand or the like have been conducted in recent years, and various types of tactile sensors are known.

For example, a tactile sensor with laminated multiple printed boards is known, where when viewed from an end face of each printed board, metallic foils on one surface of the printed board are formed in a predetermined direction (X-axis direction) and at predetermined pitches, a metallic foil is attached to another surface of the printed board, and an insulating material is interposed between given printed boards, in a thickness direction (Y-axis direction) of the printed board.

In such a tactile sensor, end faces of the laminated printed boards are covered by a conductive sheet. When pressure is applied to a portion of the conductive sheet, a metallic foil portion situated on the X-axis of a portion to which pressure is applied and a metallic foil portion situated on the Y-axis thereof are conductive and thereby a location of the portion to which pressure is applied can be electrically detected (see, for example, Patent document 1).

CITATION LIST

Patent Document

[Patent document 1] Japanese Unexamined Patent Application Publication No. H9-14989

SUMMARY

However, the tactile sensor obtains 2D information with respect to an XY-direction, but cannot obtain 3D information with respect to directions including a Z-direction.

In view of the point described above, an object of the present invention is to provide a tactile sensor that obtains 3D information.

A tactile sensor includes a support member with a curved surface, a sensor body disposed on the support member, and a buffer member with which the sensor body is coated, the buffer member being configured to, in response to contacting an object, transfer a force applied from the object to the sensor body. The sensor body includes an insulating layer, multiple first resistive portions of which a longitudinal direction of each is directed to a first direction and that are juxtaposed on one side of the insulating layer, multiple second resistive portions of which a longitudinal direction of each is directed to a second direction intersecting with the first direction and that are juxtaposed on another side of the insulating layer, and a pair of electrodes provided at both end portions of each of the first resistive portions and the second resistive portions. The press force applied from the object is transferred to the sensor body, and at least one given resistive portion among the first resistive portions and the second resistive portions is pressed, so that a resistance value between a given pair of electrodes associated with the pressed at least one given resistive portion among the first resistive portions and the second resistive portions constantly varies in accordance with a magnitude of the press force.

Effects of the Invention

According to the disclosed technique, a tactile sensor that obtains 3D information can be provided.

DESCRIPTION OF EMBODIMENTS

One or more embodiments will be hereafter described with reference to the drawings. In each figure, the same numerals denote the same components and duplicative descriptions for the components may be omitted.

First Embodiment

Figure 1:
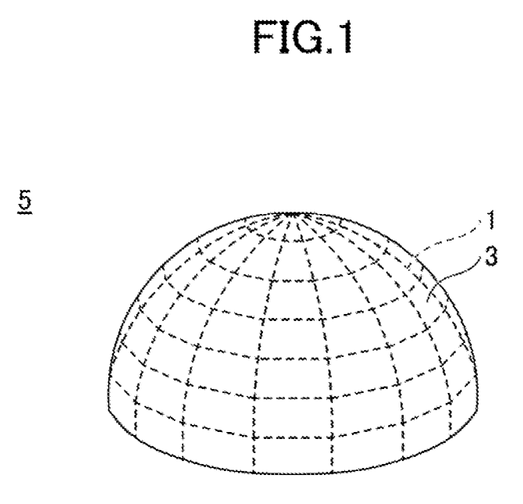
FIG. 1 is a perspective view illustrating an example of a tactile sensor according to a first embodiment.
Figure 2:
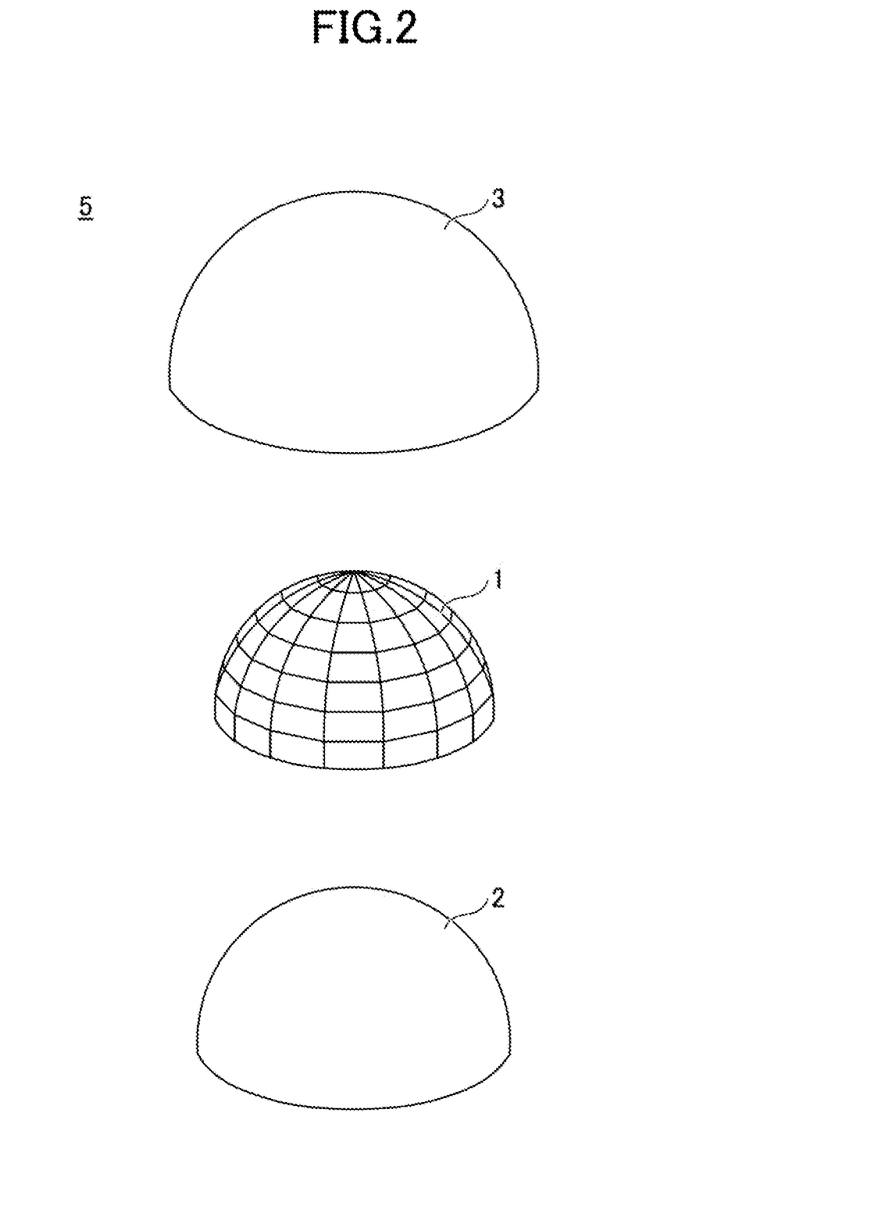
FIG. 2 is an exploded perspective view illustrating an example of the tactile sensor according to the first embodiment.

FIG. 1 is a perspective view illustrating an example of a tactile sensor according to a first embodiment. FIG. 2 is an exploded perspective view illustrating an example of the tactile sensor according to the first embodiment. Referring to FIGS. 1 and 2, a tactile sensor 5 includes a sensor body 1, a support member 2, and a buffer member 3.

In the tactile sensor 5, the sensor body 1 is disposed on the support member 2, and is coated with the buffer member 3. In other words, the sensor body 1 is sandwiched between the support member 2 and the buffer member 3. The sensor body 1 will be described below in detail.

The support member 2 is a member that has a curved surface and that is formed of a metal or resin. The shape of the support member 2 is not particularly restricted as long as the support member is a member with a curved surface. The shape of the support member 2 can be a hemisphere. The support member 2 may have a shape (shape with a curved surface portion or flat portion) that is similar to that of a person's finger.

The buffer member 3 is a member with which the sensor body 1 is coated and that mechanically protects the sensor body 1, and the member also transfers a force applied from an object to the sensor body 1, when contacting the object.

The buffer member 3 is preferably formed of an elastic body. A specific example of the material includes rubber such as silicon rubber, or a polymer material such as polyurethane. Note that the elastic body refers to an object in which strain occurs when forces are applied, and that returns to its original shape when forces are removed.

Figure 3:
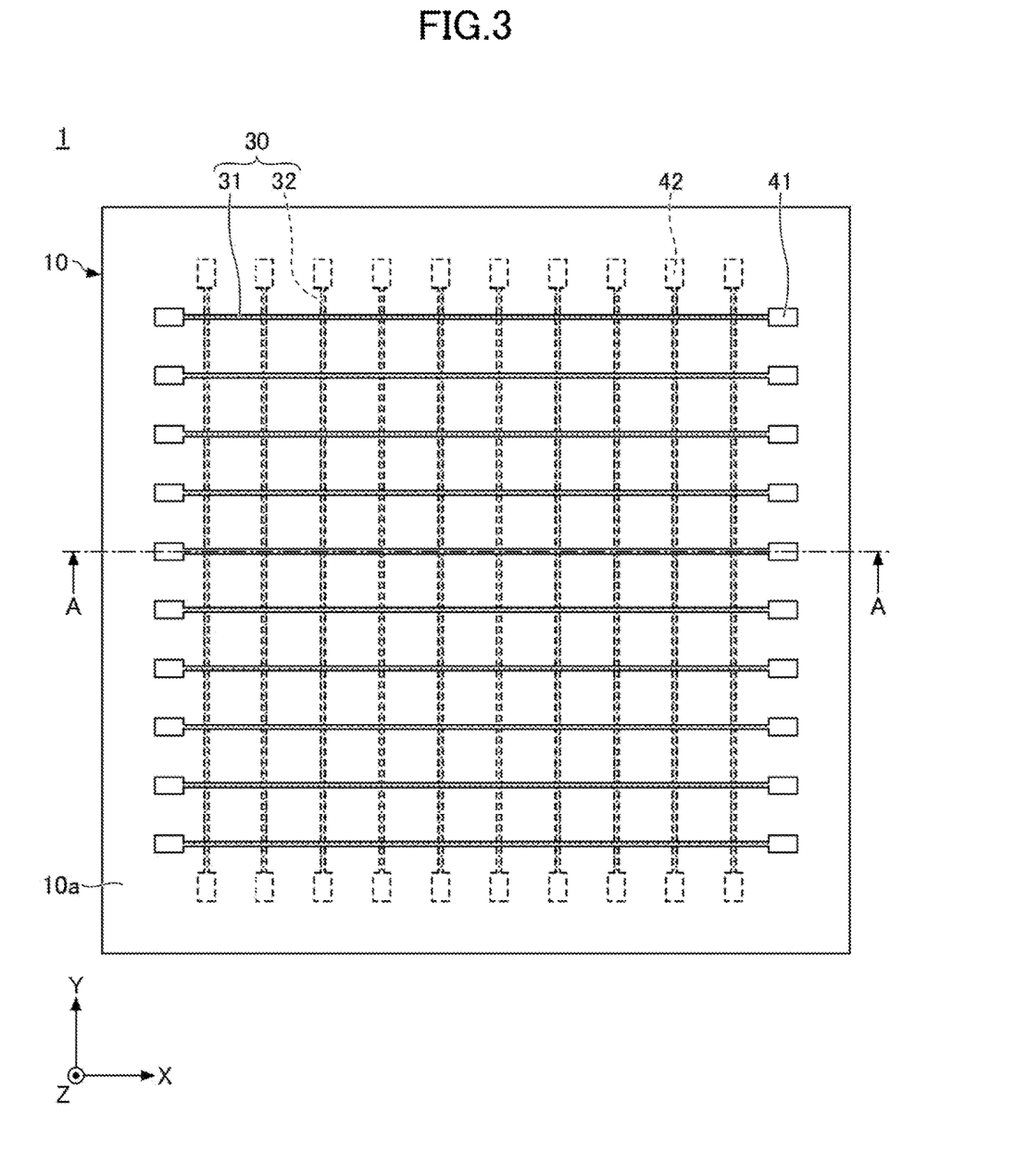
FIG. 3 is a plan view illustrating an example of a sensor body of the tactile sensor according to the first embodiment.
Figure 4:
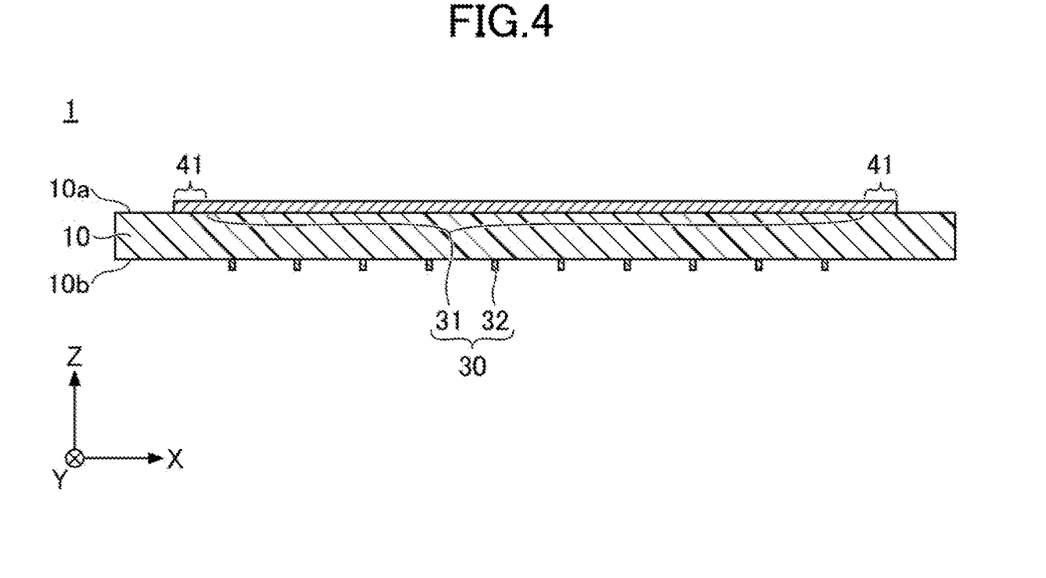
FIG. 4 is a cross-sectional view (first part) illustrating an example of the sensor body of the tactile sensor according to the first embodiment.

FIG. 3 is a plan view illustrating an example of the sensor body of the tactile sensor according to the first embodiment, and illustrates a state before the sensor body is attached to the support member 2. FIG. 4 is a cross-sectional view illustrating an example of the sensor body of the tactile sensor according to the first embodiment, and illustrates the cross section taken along the A-A line in FIG. 3.

Referring to FIGS. 3 and 4, the sensor body 1 includes a substrate 10, a resistor 30 (multiple resistive portions 31 and 32), and multiple terminal sections 41 and 42. In FIG. 3, for the sake of convenience, the planar shape of the sensor body 1 is an approximate square shape. However, the sensor body 1 can be appropriately processed in a planar shape that is easily attached to the support member 2.

Note that in the present embodiment, for the sake of convenience, in the sensor body 1, the side of the substrate 10 where the resistive portions 31 are provided is referred to as an upper side or one side, and the side of the substrate 10 where the resistive portions 32 are provided is referred to as a lower side or another side. Further, for each component, the surface on the side where one or more resistive portions 31 are provided is referred to as one surface or an upper surface, and the surface on the side where one or more resistive portions 32 are provided is referred to as another surface or a lower surface. However, the sensor body 1 can be used in a state of being upside down, or be disposed at any angle. Further, a plan view means that an object is viewed from a direction normal to an upper surface 10a of the substrate 10, and a planar shape refers to a shape of an object when viewed from the direction normal to the upper surface 10a of the substrate 10.

The substrate 10 is an insulating member that is a base layer for forming the resistor 30 or the like and is flexible. The thickness of the substrate 10 is not particularly restricted, and can be appropriately selected for any purpose. For example, such a thickness can be approximately between 5 μm and 500 μm. In particular, when the thickness of the substrate 10 is between 5 μm and 200 μm, it is preferable in terms of reducing variations in strain sensitivity of the resistive portions 31 and 32.

The substrate 10 can be formed of an insulating resin film such as a polyimide (PI) resin, an epoxy resin, a polyether ether ketone (PEEK) resin, a polyethylene naphthalate (PEN) resin, a polyethylene terephthalate (PET) resin, a polyphenylene sulfide (PPS) resin, or a polyolefin resin. Note that the film refers to a flexible member having a thickness of about 500 μm or less.

Here, the "formed of an insulating resin film" is not intended to preclude the substrate 10 from containing fillers, impurities, or the like in the insulating resin film. The substrate 10 may be formed of, for example, an insulating resin film containing fillers such as silica or alumina.

Note, however, that when the substrate 10 is not required to have insulation, the material such as $SiO_2$, $ZrO_2$ (including YSZ), Si, $Si_2N_3$, $Al_2O_3$ (including sapphire), ZnO, perovskite-based ceramics ($CaTiO_3$, $BaTiO_3$), or the like may be used for the substrate 10.

The resistor 30 is formed on the substrate 10 and is a sensitive element of which a resistance value varies continuously in accordance with the press force. The resistor 30 may be formed directly on each of the upper surface 10a and the lower surface 10b of the substrate 10, or may be formed above each of the upper surface 10a and the lower surface 10b of the substrate 10, through one or more other layers.

The resistor 30 includes resistive portions 31 and 32 that are laminated via the substrate 10. In such a case, the resistor 30 is a collective term for the multiple resistive portions 31 and 32. In particular, when the resistive portions 31 and 32 are distinguished from each other, they are referred to as the resistor 30. Note that in FIG. 3, for the sake of convenience, the resistive portions 31 and 32 are each illustrated in a crepe pattern.

The multiple resistive portions 31 are thin films of which the longitudinal direction of each is directed to the X direction and that are juxtaposed in the Y direction at predetermined intervals, on the upper surface 10a of the substrate 10. The multiple resistive portions 32 are thin films of which the longitudinal direction of each is directed to the Y direction and that are juxtaposed in the X direction at predetermined intervals, on the lower surface 10b of the substrate 10. Note, however, that the multiple resistive portions 31 and the multiple resistive portions 32 may intersect while not being required to be perpendicular to each other in a plan view.

The resistor 30 can be formed of, for example, material including Cr (chromium), material including Ni (nickel), or material including both of Cr and Ni. In other words, the resistor 30 can be formed of material including at least one among Cr and Ni. An example of the material including Cr includes a Cr composite film. An example of the material including Ni includes Cu—Ni (copper nickel). An example of the material including both of Cr and Ni includes Ni—Cr (nickel chromium).

Here, the Cr composite film is a composite film of Cr, CrN, $Cr_2N$, and the like. The Cr composite film may include incidental impurities such as chromium oxide.

The thickness of the resistor 30 is not particularly restricted, and can be appropriately selected for any purpose. The thickness can be, for example, approximately between 0.05 μm and 2 μm. In particular, when the thickness of the resistor 30 is 0.1 μm or more, it is preferable in terms of improvement in crystallinity (e.g., crystallinity of α-Cr) of a crystal that constitutes the resistor 30. When the thickness of the resistor 30 is 1 μm or less, it is further preferable in terms of reduction in cracks of a given film caused by internal stress of the film that constitutes the resistor 30, or reduction in warp in the substrate 10.

The width of the resistor 30 is not particularly restricted, and can be appropriately selected for any purpose. For example, the width can be approximately between 0.1 μm and 1 μm. A pitch between resistors next to each other is not particularly restricted, and can be appropriately selected for any purpose. For example, the pitch can be approximately between 1 mm and 100 mm. Note that in FIGS. 3 and 4, ten resistive portions 31 and ten resistive portions 32 are illustrated. However, in actuality, for each of the resistive portions 31 and the resistive portions 32, hundreds to thousands of resistive portions are provided approximately.

For example, when the resistor 30 is the Cr composite film, the resistor is formed with α-Cr (alpha-chromium) as the main component having a stable crystalline phase, so that stability of a temperature coefficient of the resistor 30, or improvement of sensitivity of the resistor 30 with respect to the press force can be achieved. Here, a main component means that a target substance is 50% by weight or more of total substances that constitute the resistor. The resistor 30 preferably includes α-Cr at 80% by weight or more, from the viewpoint of the stability of the temperature coefficient of the resistor 30 or improvement of sensitivity of the resistor 30 with respect to the press force. Note that α-Cr is Cr having a bcc structure (body-centered cubic structure).

On the upper surface 10a of the substrate 10, given terminal sections 41 respectively extend from both end portions of each resistive portion 31, and are each wider than the resistive portion 31 to be formed in an approximately rectangular shape, in a plan view. The terminal sections 41 are a pair of electrodes from which a change in a given resistance value of the resistive portion 31 in accordance with the press force is output externally, where, for example, a lead wire for external connection, or the like is joined. The upper surface of each terminal section 41 may be coated with a metal allowing for greater solderability than the terminal section 41. Note that for the sake of convenience, the resistive portions 31 and the terminal sections 41 are expressed by different numerals. However, a given resistive portion 31 and given terminal sections 41 can be integrally formed of the same material, in the same process.

On the lower surface 10b of the substrate 10, given terminal sections 42 respectively extend from both end portions of each resistive portion 32, and are each wider than the resistive portion 32 to be formed in an approximately rectangular shape, in a plan view. The terminal sections 42 are a pair of electrodes from which a change in a given resistance value of the resistive portion 32 in accordance with the press force is output externally, where, for example, a lead wire for external connection, or the like is joined. The upper surface of each terminal section 42 may be coated with a metal allowing for greater solderability than the terminal section 42. Note that for the sake of convenience, the resistive portions 32 and the terminal sections 42 are expressed by different numerals. However, a given resistive portion 32 and given terminal sections 42 can be integrally formed of the same material, in the same process.

Note that through interconnects (through holes) are provided through the substrate 10, and the terminal sections 41 and 42 may be collected on the upper surface 10a side or the lower surface 10b side of the substrate 10.

A cover layer (insulating resin layer) may be disposed on and above the upper surface 10a of the substrate 10, such that the resistive portions 31 are coated and the terminal sections 41 are exposed. A cover layer (insulating resin layer) may be also disposed on and above the lower surface 10b of the substrate 10, such that the resistive portions 32 are coated and the terminal sections 42 are exposed. By providing the cover layers, mechanical damage and the like can be prevented from occurring in the resistive portions 31 and 32. Further, by providing the cover layers, the resistive portions 31 and 32 can be protected against moisture and the like. Note that one or more cover layers may be provided to cover all portions except for the terminal sections 41 and 42.

The cover layer can be formed of an insulating resin such as a PI resin, an epoxy resin, a PEEK resin, a PEN resin, a PET resin, a PPS resin, or a composite resin (e.g., a silicone resin or a polyolefin resin). The cover layer may contain fillers or pigments. The thickness of the cover layer is not particularly restricted, and can be appropriately selected for any purpose. For example, the thickness may be approximately between 2 μm and 30 μm.

In order to manufacture the sensor body 1, first, the substrate 10 is prepared and the resistive portions 31 and the terminal sections 41 each of which has the planar shape illustrated in FIG. 3 are formed on the upper surface 10a of the substrate 10. The material and thickness for each of the resistive portions 31 and the terminal sections 41 are the same as the material and thickness described above. The resistive portions 31 and the terminal sections 41 can be integrally formed of the same material.

The resistive portions 31 and the terminal sections 41 can be formed, for example, such that a raw material capable of forming the resistive portions 31 and the terminal sections 41 is a target to be deposited by magnetron sputtering, and such that patterning is performed by photolithography. Instead of magnetron sputtering, the resistive portions 31 and the terminal sections 41 may be deposited by reactive sputtering, vapor deposition, arc ion plating, pulsed laser deposition, or the like.

From the viewpoint of achieving the stability of the temperature coefficient of each resistive portion 31 and improvement of sensitivity of the resistive portion 31 with respect to the press force, before depositing the resistive portions 31 and the terminal sections 41, preferably, as a base layer, a functional layer having a film thickness that is approximately between 1 nm and 100 nm is vacuum-deposited. The functional layer can be deposited by conventional sputtering, for example. Note that, after forming the resistive portions 31 and the terminal sections 41 on the entire upper surface of the functional layer, the functional layer, as well as the resistive portions 31 and the terminal sections 41, are patterned in the planar shape illustrated in FIG. 3, by photolithography.

In the present application, the functional layer refers to a layer that has a function of promoting crystal growth of the resistive portions that are at least an upper layer. The functional layer preferably further has a function of preventing oxidation of the resistive portions caused by oxygen and moisture included in the substrate 10, as well as a function of improving adhesion between the substrate 10 and each resistive portion. The functional layer may further have other functions.

The insulating resin film constituting the substrate 10 contains oxygen and moisture. In this regard, particularly when each resistive portion includes Cr, it is effective for the functional layer to have a function of preventing oxidation of the resistive portion, because Cr forms an autoxidized film.

The material of the functional layer is not particularly restricted as long as it is material having a function of promoting crystal growth of the resistive portions that are at least an upper layer. Such material can be appropriately selected for any purpose, and includes one or more metals selected from the group consisting of, for example, Cr (chromium), Ti (titanium), V (vanadium), Nb (niobium), Ta (tantalum), Ni (nickel), Y (yttrium), Zr (zirconium), Hf (hafnium), Si (silicon), C (carbon), Zn (zinc), Cu (copper), Bi (bismuth), Fe (iron), Mo (molybdenum), W (tungsten), Ru (ruthenium), Rh (rhodium), Re (rhenium), Os (osmium), Ir (iridium), Pt (platinum), Pd (palladium), Ag (silver), Au (gold), Co (cobalt), Mn (manganese), and Al (aluminum); an alloy of any metals among the group; or a compound of any metal among the group.

Examples of the above alloy include FeCr, TiAl. FeNi, NiCr, CrCu, and the like. Examples of the above compound include TiN, TaN, $Si_3N_4$, $TiO_2$, $Ta_2O_5$, $SiO_2$, and the like.

The functional layer can be vacuum-deposited by, for example, conventional sputtering in which a raw material capable of forming the functional layer is the target and an Ar (argon) gas is supplied to a chamber. With use of conventional sputtering, the functional layer is deposited while the upper surface 10a of the substrate 10 is etched with Ar. Thus, a deposited amount of a film of the functional layer is minimized and thus the effect of improving adhesion can be obtained.

However, this is an example of a method of depositing the functional layer, and the functional layer may be formed by other methods. For example, as such a method, before depositing the functional layer, the upper surface 10*a* of the substrate 10 is activated by plasma treatment such as plasma treatment using Ar or the like, to thereby obtain the effect of improving the adhesion. Subsequently, the functional layer may be vacuum-deposited by magnetron sputtering.

A combination of the material of the functional layer, and the material of the resistive portions 31 and the terminal sections 41 is not particularly restricted, and can be appropriately selected for any purpose. For example, Ti is used for the functional layer, and a Cr composite film formed with α-Cr (alpha-chromium) as the main component can be deposited as the resistive portions 31 and the terminal sections 41.

In this case, each of the resistive portions 31 and the terminal sections 41 can be deposited by, for example, magnetron sputtering in which a raw material capable of forming the Cr composite film is the target and an Ar gas is supplied to a chamber. Alternatively, the resistive portions 31 and the terminal sections 41 may be deposited by reactive sputtering in which pure Cr is the target and an appropriate amount of nitrogen gas, as well as an Ar gas, are supplied to a chamber.

In such methods, a growth surface of the Cr composite film is defined by the functional layer formed of Ti, and a Cr composite film that is formed with α-Cr as the main component having a stable crystalline structure can be deposited. Also, Ti that constitutes the functional layer is diffused into the Cr composite film, so that stability of the temperature coefficient of each resistive portion 31 and improvement of sensitivity of the resistive portion 31 with respect to a given press force can be achieved. Note that, when the functional layer is formed of Ti, the Cr composite film may include Ti or TiN (titanium nitride).

Note that when each resistive portion 31 is a Cr composite film, the functional layer formed of Ti includes all functions of a function of promoting crystal growth of the resistive portion 31, a function of preventing oxidation of the resistive portion 31 caused by oxygen or moisture contained in the substrate 10, and a function of improving adhesion between the substrate 10 and the resistive portion 31. Instead of Ti, when the functional layer is formed of Ta, Si, Al, or Fe, the functional layer also includes the same functions.

As described above, by providing the functional layer in the lower layer of the resistive portions 31, crystal growth of the resistive portions 31 can be promoted and thus the resistive portions 31 each having a stable crystalline phase can be fabricated. As a result, in the sensor body 1, stability of the temperature coefficient of each resistive portion 31 and improvement of sensitivity of each resistive portion 31 with respect to a given press force can be achieved.

Next, the resistive portions 32 and the terminal sections 42 each of which has the planar shape illustrated in FIG. 3 are formed on the lower surface 10*b* of the substrate 10. The resistive portions 32 and the terminal sections 42 can be formed in the same method as the resistive portions 31 and the terminal sections 41. Likewise, the functional layer as a base layer is preferably vacuum-deposited before depositing the resistive portions 32 and the terminal sections 42.

After forming the resistive portions 31 and the terminal sections 41, and the resistive portions 32 and the terminal sections 42, a given cover layer with which the resistive portions 31 are coated and that exposes the terminal sections 41 may be provided on and above the upper surface 10*a* of the substrate 10, and further, a given cover layer with which the resistive portions 32 are coated and that exposes the terminal sections 42 may be provided on and above the lower surface 10*b* of the substrate 10. As a result, the sensor body 1 is completed.

A given cover layer can be fabricated, such that a thermosetting insulating resin film in a semi-cured state is laminated on the upper surface 10*a* of the substrate 10, and such that the resistive portions 31 are coated therewith and the terminal sections 41 are exposed and subsequently, heat is added and curing is performed. Further, a given cover layer can be fabricated, such that a thermosetting insulating resin film in a semi-cured state is laminated on the lower surface 10*b* of the substrate 10, and such that the resistive portions 32 are coated therewith and the terminal sections 42 are exposed and subsequently, heat is added and curing is performed. Instead of use of a laminated insulating resin film, a given cover layer may be formed such that a thermosetting insulating resin that is liquid or paste-like is applied and subsequently, heat is added and curing is performed.

Figure 5:
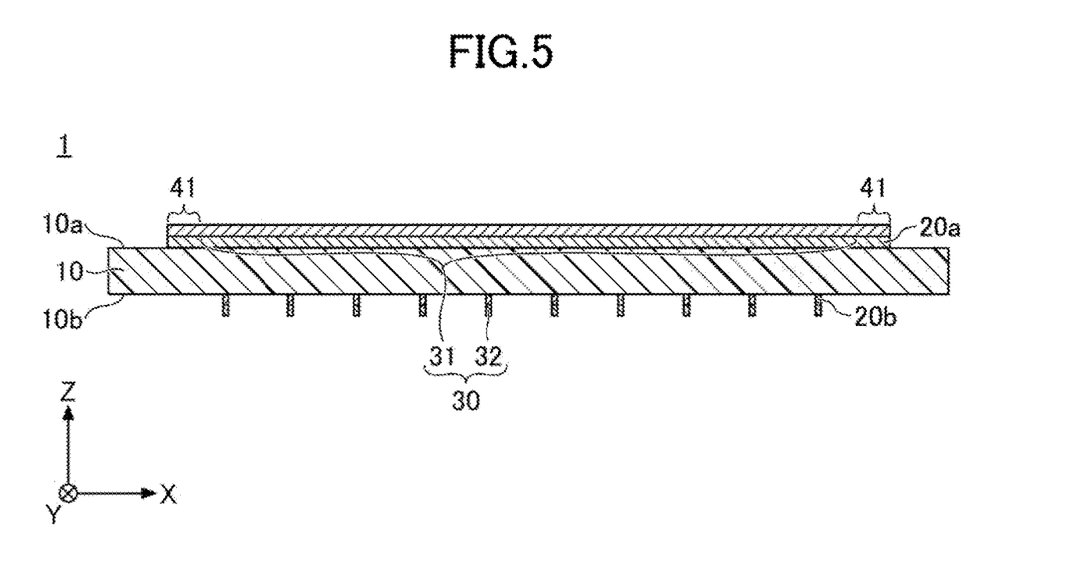
FIG. 5 is a cross-sectional view (second part) illustrating an example of the sensor body of the tactile sensor according to the first embodiment.

Note that when a given functional layer as a base layer of the resistive portions 31 and the terminal sections 41 is provided on the upper surface 10*a* of the substrate 10, and a given functional layer as a base layer of the resistive portions 32 and the terminal sections 42 is provided on the lower surface 10*b* of the substrate 10, the sensor body 1 has the cross-section shape illustrated in FIG. 5. Layers expressed by the numerals 20*a* and 20*b* indicate the respective functional layers. The planar shape of the sensor body 1 in the case of providing the functional layers 20*a* and 20*b* is the same as that in FIG. 3.

Figure 6:
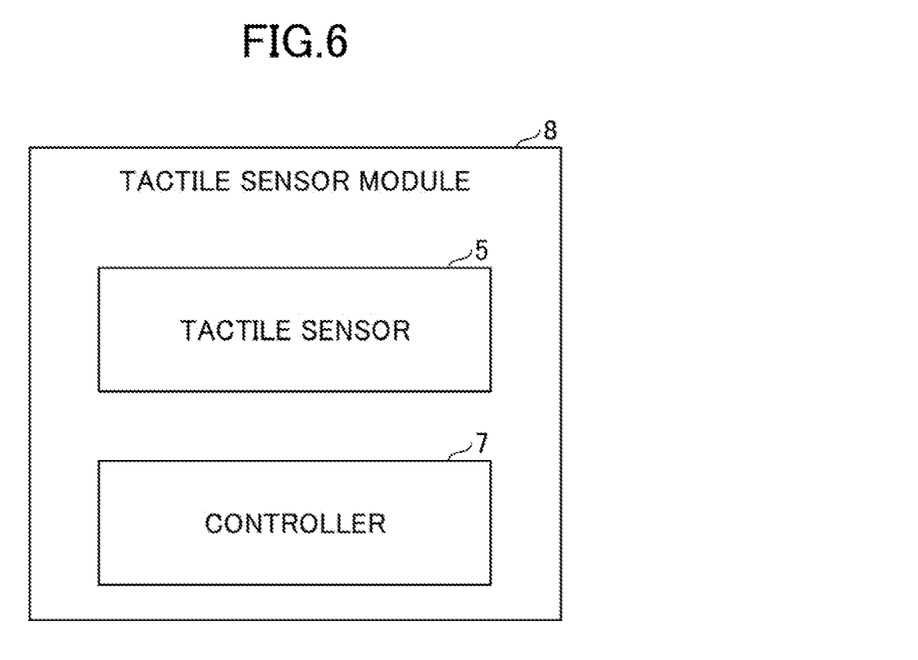
FIG. 6 is a block diagram illustrating an example of a tactile sensor module according to the first embodiment.

As illustrated in FIG. 6, the tactile sensor module 8 can be achieved by the tactile sensor 5 and the controller 7. In the tactile sensor module 8, the tactile sensor 5 is attached to, for example, a fingertip in a robot hand, and a location in contact with an object, a gripping force, and the like can be detected by the controller 7 when a robot grips the object. Multiple tactile sensors 5 may be attached to respective fingertips in the robot hand. For example, when respective tactile sensors 5 are attached to two fingertips in the robot hand and an object is gripped with the two fingertips in the robot hand, locations in contact with the object, gripping forces, and the like can be detected by the controller 7, based on the outputs of the respective tactile sensors 5.

In the tactile sensor module 8, the terminal sections 41 and 42 of the sensor body 1 in the tactile sensor 5 are each connected to the controller 7, by using, for example, a flexible substrate, a lead wire, or the like.

Based on information obtained through given terminal sections 41 and 42 of the sensor body 1, coordinates of a given location at which the sensor body 1 of the tactile sensor 5 is pressed, and the gripping force, and the like can be detected. For example, each resistive portion 31 of the sensor body 1 can be used to perform detection with respect to an X-coordinate, and each resistive portion 32 can be used to perform detection with respect to a Y-coordinate.

Figure 7:
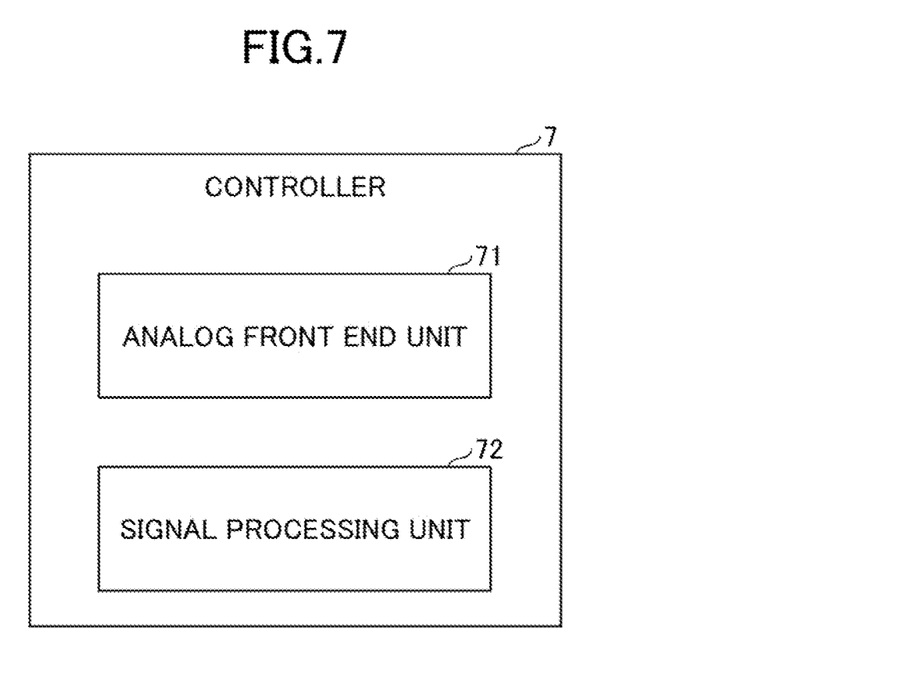
FIG. 7 is a block diagram illustrating an example of a controller of the tactile sensor module according to the first embodiment.

As illustrated in FIG. 7, for example, the controller 7 can include an analog front end unit 71 and a signal processing unit 72.

The analog front end unit 71 includes, for example, an input signal selection switch, a bridge circuit, an amplifier, an analog-to-digital conversion circuit (A/D conversion circuit), and the like. The analog front end unit 71 may include a temperature compensation circuit.

In the analog front end unit 71, for example, all of the terminal sections 41 and 42 of the sensor body 1 are connected to the input signal selection switch, and a pair of electrodes is selected by the input signal selection switch. A given pair of electrodes selected by the input signal selection switch is connected to the bridge circuit.

In such a case, one side of the bridge circuit is comprised of a given resistive portion between a given pair of electrodes selected by the input signal selection switch, and the other three sides are each comprised of fixed resistance. With such a configuration, as the output of the bridge circuit, a voltage (analog signal) corresponding to a resistance value of the resistive portion between a given pair of electrodes selected by the input signal selection switch can be obtained. Note that the input signal selection switch is configured to be able to be controlled by the signal processing unit 72.

An output voltage of the bridge circuit is amplified by the amplifier and then is converted to a digital signal by the A/D conversion circuit. The digital signal is transmitted to the signal processing unit 72. When the analog front end unit 71 includes a temperature compensation circuit, a digital signal for which temperature compensation is performed is transmitted to the signal processing unit 72. By performing switching through the input signal selection switch at high speed, digital signals corresponding to resistance values associated with all of the terminal sections 41 and 42 of the sensor body 1 can be transmitted to the signal processing unit 72 in an extremely short amount of time.

Based on information transmitted from the analog front end unit 71, the signal processing unit 72 can identify one or more coordinates of locations at which the sensor body 1 is pressed, as well as detecting the magnitude of a given press force.

When resistance values for multiple resistive portions 31 or resistance values for multiple resistive portions 32 are varied, it can be detected that the sensor body 1 is pressed at corresponding multiple locations.

Note that when the magnitude of the press force is decreased, or the like, there are cases where only one or more resistive portions that are closer to the pressed side and that are among the resistive portions 31 and the resistive portions 32 are pressed while any resistive portion that is far from the pressed side is not pressed. In this case, only a resistance value between a pair of electrodes associated with each of the resistive portions that is closer to the pressed side, constantly varies in accordance with the magnitude of the press force. In such a case, the signal processing unit 72 can detect the magnitude of the press force based on the magnitude of variations in a given resistance value of the resistive portion that is closer to the pressed side.

In other words, at least one resistive portion among a given resistive portion 31 and a given resistive portion 32 is pressed, and a resistance value between a pair of electrodes associated with the at least one resistive portion (resistive portion 31 and/or resistive portion 32) constantly varies in accordance with the magnitude of the press force. Regardless of whether either one of the resistive portion 31 and the resistive portion 32 is pressed or both are pressed, the signal processing unit 72 can detect the magnitude of the press force based on the magnitude of variations in a given resistance value of the resistive portion that is closer to the pressed side.

The signal processing unit 72 can include, for example, a central processing unit (CPU), a read only memory (ROM), a random access memory (RAM), a main memory, and the like.

In this case, various functions of the signal processing unit 72 can be implemented by executing a program stored in the ROM or the like, where the program is read out to a main memory and is executed by the CPU. However, a portion or all of the signal processing unit 72 may be implemented by hardware only. The signal processing unit 72 may be also configured physically by a plurality of devices or the like.

Figure 8A:
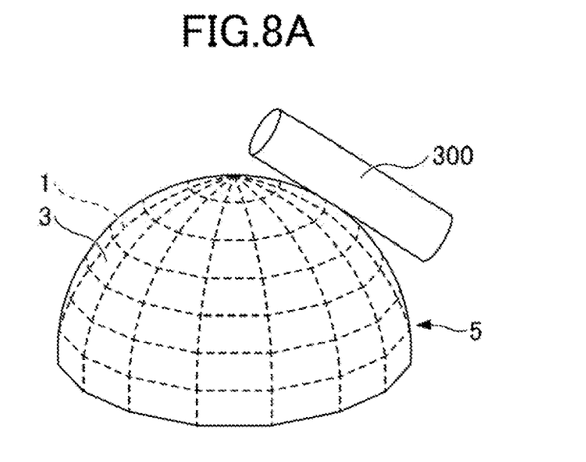
FIG. 8A is a diagram (first part) schematically illustrating a force transferred to the sensor body when the tactile sensor touches an object.
Figure 8B:
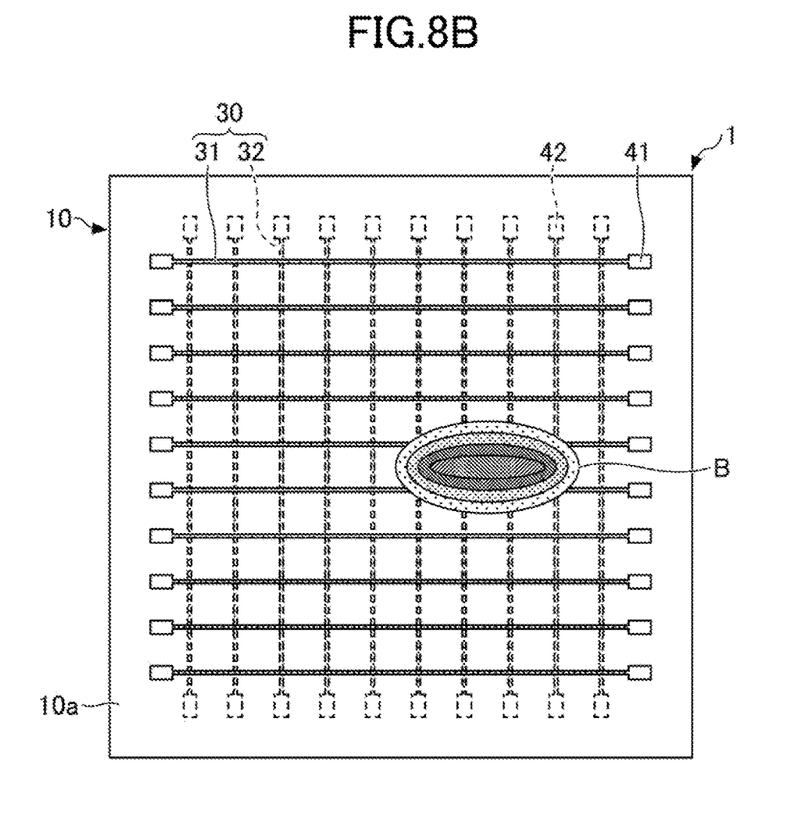
FIG. 8B is a diagram (second part) schematically illustrating the force transferred to the sensor body when the tactile sensor touches the object.

FIGS. 8A and 8B are diagrams schematically illustrating the force transferred to the sensor body when the tactile sensor touches the object. FIG. 8A is a perspective view of the tactile sensor, and FIG. 8B is a plan view schematically illustrating the sensor body in a state of detecting the force.

As illustrated in FIG. 8A, when the tactile sensor 5 touches an object 300, the buffer member 3 becomes deformed and thus the force is transferred to the sensor body 1. When the buffer member 3 becomes deformed, the sensor body 1 can detect the force as surface data, instead of point data, as illustrated at a B portion in FIG. 8B. With such a configuration, it is possible to detect the location on the fingertip at which the object is gripped and the extent of force. Note that at the portion B, at a state where the force increases as it is closer to the center while the force decreases as it approaches the outside, is illustrated in a crepe pattern.

When tactile sensors 5 are attached to the respective fingertips in the robot hand, and the object is gripped by the fingertips in the robot hand, the center of gravity of the object that the robot grips can be detected based on the output of the tactile sensors 5.

As described above, for the tactile sensor 5, when the buffer member 3 contacts the object, the buffer member 3 becomes deformed and thereby the force applied from the object is transferred to the sensor body 1, so that the resistive portions 31 and 32 are pressed. When the resistive portions 31 and 32 of the sensor body 1 are pressed, the pressed resistive portions 31 and 32 are deflected in accordance with the press force, and thus the resistance value between a given pair of electrodes associated with the pressed resistive portions 31 and 32 varies continuously in accordance with the magnitude of the press force. That is, the tactile sensor 5 can obtain 3D information (coordinates of the pressed location and the magnitude of the press force).

In the tactile sensor module 8, 3D information obtained by the sensor body 1 is transmitted to the controller 7, and the controller 7 can detect coordinates of the location at which the sensor body 1 is pressed, and the magnitude of the press force, based on the 3D information obtained by the sensor body 1.

In particular, when the resistive portions 31 and 32 are each formed of a Cr composite film, sensitivity of a resistance value with respect to a force (a change amount of the resistance value for each of the resistive portions 31 and 32 with respect to the same press force) is significantly improved in comparison to a case where the resistive portions 31 and 32 are each formed of Cu—Ni or Ni—Cr. When the resistive portions 31 and 32 are each formed of the Cr composite film, sensitivity of the resistance value with respect to the force is about 5 to 10 times greater than that in a case where the resistive portions 31 and 32 are each formed of Cu—Ni or Ni—Cr. For this reason, by forming each of the resistive portions 31 and 32 of a Cr composite film, detection accuracy of coordinates of the pressed location can be improved, and the force can be detected with high sensitivity.

When sensibility of the resistance value with respect to a given force is increased, a control can be achieved such that, a predetermined operation is performed when it is detected that the force is at weak level, another operation is performed when it is detected that the force is at middle level, and still another operation is performed when it is detected that the force is at strong level. Alternatively, a control can be achieved such that, no operation is performed when it is detected that the force is at weak or middle level, and a predetermined operation is performed only when it is detected that the force is at strong level.

When sensibility of the resistance value with respect to a given force is increased, a signal with increased S/N can be obtained. Thus, signal detection can be performed accurately even when the number of times the A/D conversion circuit of the analog front end unit 71 performs averaging is reduced. By reducing the number of times the A/D conversion circuit performs averaging, a time required for one A/D conversion can be decreased, so that the input signal selection switch can perform switching at a higher speed. As a result, a fast movement transferred to the tactile sensor 5 can also be detected.

First Modification of the First Embodiment

The first modification of the first embodiment provides an example in which the resistive portions of the sensor body are each disposed in a zigzag pattern. Note that in the first modification of the first embodiment, the description for the same components as the embodiment described previously may be omitted.

Figure 9:
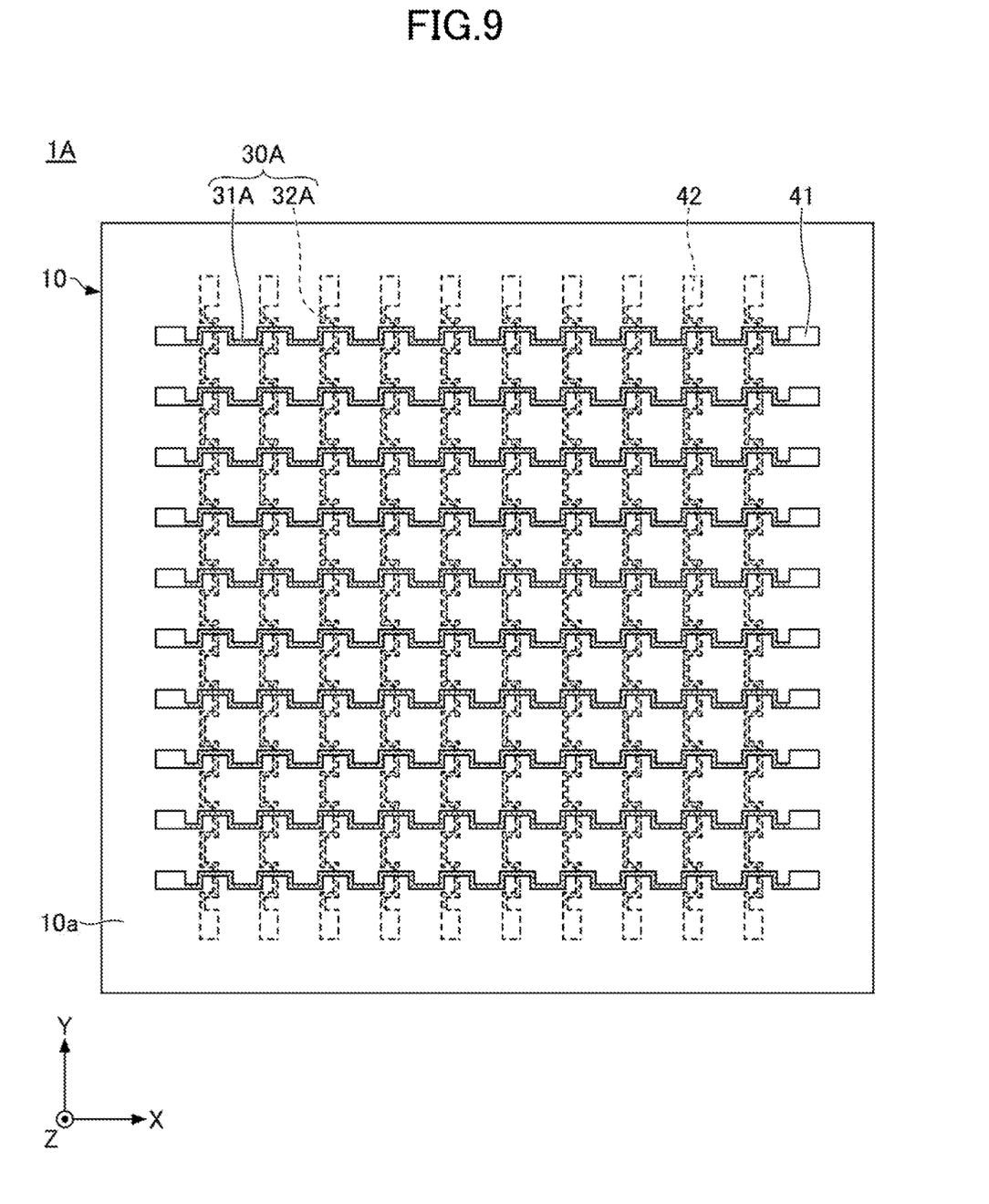
FIG. 9 is a plan view illustrating an example of the sensor body according to the first modification of the first embodiment.

FIG. 9 is a plan view illustrating an example of the sensor body according to the first modification of the first embodiment, and illustrates the plane corresponding to FIG. 3. Referring to FIG. 9, the sensor body 1A differs from the sensor body 1 (see FIGS. 3 and 4) in that a resistor 30A is used instead of the resistor 30.

The resistor 30A includes resistive portions 31A and 32A. Each resistive portion 31A is disposed in a zigzag pattern formed between a pair of given terminal sections 41. Each resistive portion 32A is also disposed in a zigzag pattern formed between a pair of given terminal sections 42. For example, the material and thickness for each of the resistive portions 31A and 32A can be the same as the material and thickness for each of the resistive portions 31 and 32.

In such a configuration, when the resistive portions 31A and 32A are each disposed in a zigzag pattern, a resistance value between a given pair of terminal sections 41 and a resistance value between a given pair of terminal sections 42 can be increased in comparison to a case where their resistive portions are each disposed in a linear pattern. As a result, when pressed, a change amount of the resistance value between a given pair of terminal sections 41, and a change amount of the resistance value between a given pair of terminal sections 42, are increased. Thus, detection accuracy of coordinates of the pressed location can be improved, and the force can be detected with high sensitivity.

Further, the resistance value between a given pair of terminal sections 41 and the resistance value between a given pair of terminal sections 42 can be increased, thereby enabling power consumption for the sensor body 1A to be reduced.

The preferred embodiment and the like have been described above in detail, but are not limiting. Various modifications or substitutions to the embodiment and the like described above can be made without departing from a scope set forth in the claims.

For example, an example of the sensor body 1 in which the resistive portions 31 are provided on the upper surface 10a of the substrate 10 that is an insulating layer, and the resistive portions 32 are provided on the lower surface 10b thereof, is illustrated. However, such an example is not limiting as long as there is a structure in which the resistive portions 32 are provided on one side of an insulating layer, and the resistive portions 32 are provided on another side of the insulating layer. For example, the resistive portions 31 are provided on the upper surface 10a of the substrate 10, an insulating layer with which the resistive portions 31 are coated is provided above the upper surface 10a of the substrate 10, and the resistive portions 32 may be provided on the insulating layer. Further, a first substrate on which the resistive portions 31 are provided, and a second substrate on which the resistive portions 32 are provided, are fabricated, and then the first substrate on which the resistive portions 31 are provided and the second substrate on which the resistive portions 32 are provided may be bonded together such that the resistive portions 31 and resistive portions 32 face inward and an insulating layer is interposed between the first substrate and the second substrate. Also, a first substrate on which the resistive portions 31 are provided, and a second substrate on which the resistive portions 32 are provided, are fabricated, and then the first substrate on which the resistive portions 31 are provided and the second substrate on which the resistive portions 32 are provided may be laminated in the same direction. The same configurations described above apply to the sensor body 1A.

This International Application claims priority to Japanese Patent Application No. 2018-137451, filed Jul. 23, 2018, the contents of which are incorporated herein by reference in their entirety.

REFERENCE SIGNS LIST 1, 1A sensor body, 2 support member, 3 buffer member, 5 tactile sensor, 7 controller, 8 tactile sensor module, 10 substrate, 10a upper surface of substrate, 10b lower surface of substrate, 20a, 20b functional layer, 30, 30A resistor, 31, 31A, 32, 32A resistive portion, 41, 42 terminal section, 71 analog front end unit, 72 signal processing unit

The invention claimed is:

1. A tactile sensor comprising:
a support member with a curved surface;
a sensor body disposed on the support member; and
a buffer member with which the sensor body is coated, the buffer member being configured to, in response to contacting an object, transfer a force applied from the object to the sensor body,
wherein the sensor body includes:
an insulating layer;
multiple first resistive portions of which a longitudinal direction of each is directed to a first direction and that are juxtaposed on one side of the insulating layer;
multiple second resistive portions of which a longitudinal direction of each is directed to a second direction intersecting with the first direction and that are juxtaposed on another side of the insulating layer; and
a pair of electrodes provided at both end portions of each of the first resistive portions and the second resistive portions,
wherein the press force applied from the object is transferred to the sensor body, and at least one given resistive portion among the first resistive portions and the second resistive portions is pressed, so that a resistance value between a given pair of electrodes associated with the pressed at least one given resistive portion among the first resistive portions and the second resistive portions constantly varies in accordance with a magnitude of the press force, and
wherein each of the first resistive portions and the second resistive portions is formed of a film containing Cr, CrN and $Cr_2N$.

2. The tactile sensor according to claim 1, wherein location detection with respect to the first direction and the second direction is capable of being performed based on a variation in a resistance value of a given first resistive portion and a variation in a resistance value of a given second resistive portion.

3. The tactile sensor according to claim 1, wherein the buffer member is formed of an elastic body.

4. The tactile sensor according to claim 1, wherein each of the first resistive portions and the second resistive portions is disposed in a zigzag pattern that is formed between a given pair of electrodes.

5. The tactile sensor according to claim 1, wherein a main component of each of the first resistive portions and the second resistive portions is alpha-chromium.

6. The tactile sensor according to claim 5, wherein each of the first resistive portions and the second resistive portions includes alpha-chromium at 80% by weight or more.

7. The tactile sensor according to claim 1, further comprising a functional layer formed of a metal, an alloy, or a metal compound, in a lower layer of each of the first resistive portions and the second resistive portions.

8. The tactile sensor according to claim 7, wherein the functional layer includes a function of promoting crystal growth of each of the first resistive portions and the second resistive portions.

9. A tactile sensor comprising:
a support member having a hemisphere shape with a curved surface;
a sensor body attached to the curved surface of the support member and protruding toward an object; and
a buffer member with which the sensor body is coated, the buffer member being configured to, in response to contacting the object, transfer a force applied from the object to the sensor body,
wherein the sensor body includes:
an insulating layer;
multiple first resistive portions of which a longitudinal direction of each is directed to a first direction and that are juxtaposed on one side of the insulating layer;
multiple second resistive portions of which a longitudinal direction of each is directed to a second direction intersecting with the first direction and that are juxtaposed on another side of the insulating layer; and
a pair of electrodes provided at both end portions of each of the first resistive portions and the second resistive portions,
wherein the press force applied from the object is transferred to the sensor body, and at least one given resistive portion among the first resistive portions and the second resistive portions is pressed, so that a resistance value between a given pair of electrodes associated with the pressed at least one given resistive portion among the first resistive portions and the second resistive portions constantly varies in accordance with a magnitude of the press force.

10. The tactile sensor according to claim 9, wherein location detection with respect to the first direction and the second direction is capable of being performed based on a variation in a resistance value of a given first resistive portion and a variation in a resistance value of a given second resistive portion.

11. The tactile sensor according to claim 9, wherein the buffer member is formed of an elastic body.

12. The tactile sensor according to claim 9, wherein each of the first resistive portions and the second resistive portions is disposed in a zigzag pattern that is formed between a given pair of electrodes.

13. The tactile sensor according to claim 9, wherein each of the first resistive portions and the second resistive portions is formed of a Cr composite film.

14. The tactile sensor according to claim 13, wherein a main component of each of the first resistive portions and the second resistive portions is alpha-chromium.

15. The tactile sensor according to claim 14, wherein each of the first resistive portions and the second resistive portions includes alpha-chromium at 80% by weight or more.

16. The tactile sensor according to claim 14, wherein each of the first resistive portions and the second resistive portions includes chromium nitride.

17. The tactile sensor according to claim 9, further comprising a functional layer formed of a metal, an alloy, or a metal compound, in a lower layer of each of the first resistive portions and the second resistive portions.

18. The tactile sensor according to claim 17, wherein the functional layer includes a function of promoting crystal growth of each of the first resistive portions and the second resistive portions.

* * * * *